United States Patent [19]
Smiley

[11] 3,989,265
[45] Nov. 2, 1976

[54] TRAILER FOR BOAT AND MOTORCYCLE

[75] Inventor: Robert W. Smiley, Salem, Va.

[73] Assignee: The Raymond Lee Organization, Inc., a part interest

[22] Filed: June 16, 1975

[21] Appl. No.: 587,319

[52] U.S. Cl. .............................. 280/414 R; 214/450
[51] Int. Cl.² ......................................... B60R 11/00
[58] Field of Search ...................... 280/414 R, 400; 214/450; 224/42.03 B, 42.03 R, 42.08

[56] References Cited
UNITED STATES PATENTS

| | | | |
|---|---|---|---|
| 2,442,248 | 5/1948 | Sampsell | 280/414 R X |
| 2,646,285 | 7/1953 | Snyder | 280/27 |
| 3,348,713 | 10/1967 | Will | 214/450 |
| 3,731,830 | 5/1973 | Long | 214/450 |
| 3,751,073 | 8/1973 | Alexander et al. | 280/414 R X |
| 3,753,579 | 8/1973 | Kurilich, Jr. | 280/400 |
| 3,805,984 | 4/1974 | Schwarz et al. | 214/450 |

Primary Examiner—Robert R. Song
Assistant Examiner—Milton L. Smith

[57] ABSTRACT

A trailer adapted to be pulled by an automobile or other vehicle and adapted to support a boat is also used to support at least one motorcycle. The trailer has a longitudinally extending horizontally elongated bar. First and second parallel vertical plates are secured to the bar and extend upward and outward therefrom at right angles thereto. A horizontally elongated member pivotally engaging the bar is disposed between the plates and extends outward therefrom at right angles to the bar. Means are provided to lock the member in horizontal position or to release the member and allow it to pivot. In use, the member is allowed to pivot until one end touches the ground. A motorcycle is then rolled on top of the member until it pivots back into horizontal position. The member is then locked in place and the motorcycle secured in position on the trailer. Alternatively, an extension can be detachably secured to the member to enable the motorcycle to be moved into position.

4 Claims, 9 Drawing Figures

TRAILER FOR BOAT AND MOTORCYCLE

SUMMARY OF THE INVENTION

This invention is directed toward a wheeled trailer for supporting demountably a boat and adapted to be pulled by a vehicle such as an automobile and is more particularly directed toward a trailer of this type which can also be used to transport one or more motorcycles simultaneously while transporting the boat.

To this end, the trailer is provided with a horizontally elongated longitudinally extending bar. The boat is secured in conventional manner and the bar extends beyond the boat.

First and second vertical parallel plates are secured to the bar and extend upward and outward from opposite sides of the bar. A horizontally elongated member is disposed between the plates and extends outward from opposite sides of the plates at right angles to the bar. The member pivotally engages the bar. Means manually engagable with and disengagable from plates and member either lock the member in horizontal position or allow the member to pivot.

In use, the member is pivoted until one end touches the ground. A motorcycle is then rolled on top of the member and is moved thereon until the weight is centered and the member pivoted into horizontal position. The member is then locked into horizontal position and the motorcycle secured in place to the trailer. Alternatively, an extension can be detachably secured to the member to facilitate this action.

The trailer can thus be used to transport both boat and motorcycle simultaneously. By using additional like structures, a plurality of motorcycles can be carried simultaneously on the trailer.

BRIEF DESCRIPTION OF THE DRAWINGS

FIGS. 8 and 9 show a modification.

DETAILED DESCRIPTION OF PREFERRED EMBODIMENTS

Figure 1:
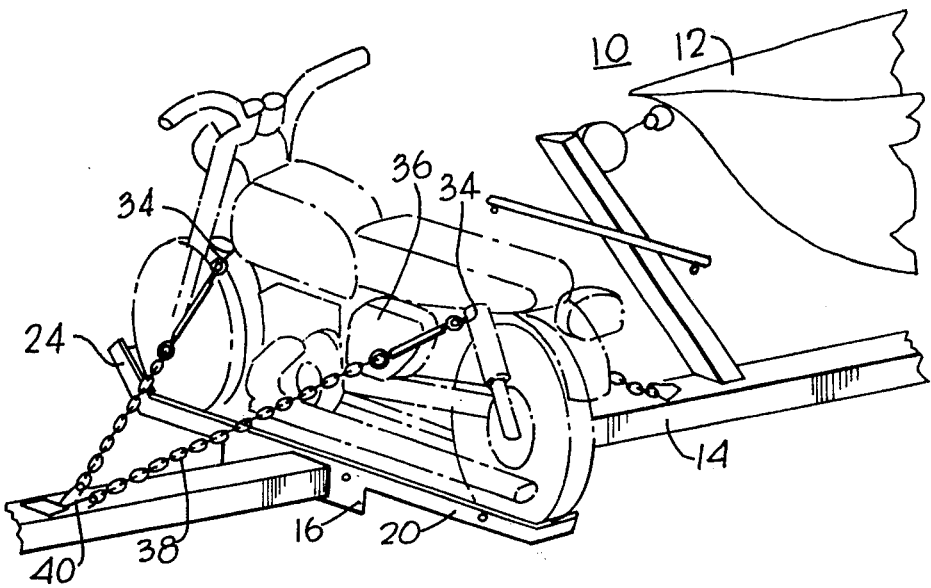
FIG. 1 is a detail perspective view of the invention.
Figure 2:
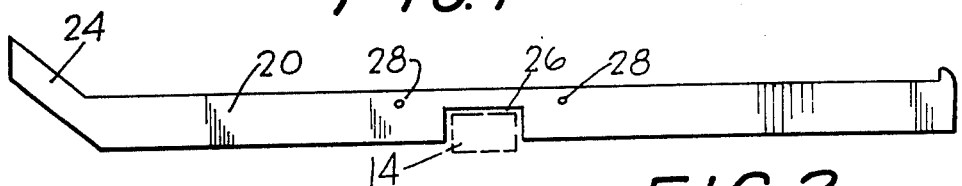
FIG. 2 is a side view of the horizontal member.
Figure 3:
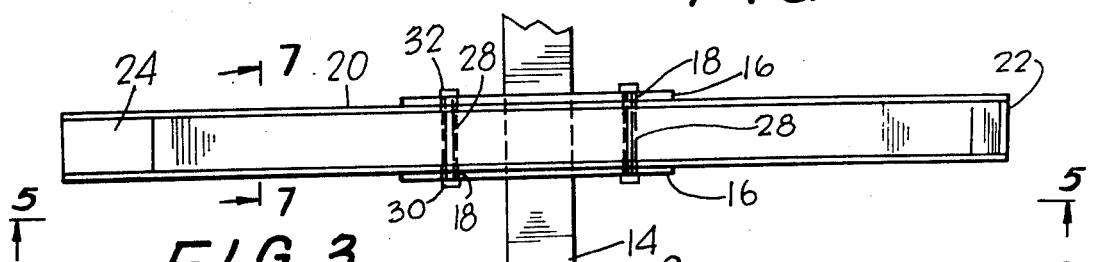
FIG. 3 is a top detail view of the bar, horizontal member, vertical plate and locking means.
Figure 4:
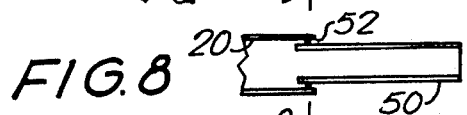
FIG. 4 is a detail view of a turnbuckle and chain as used in the invention.
Figure 5:
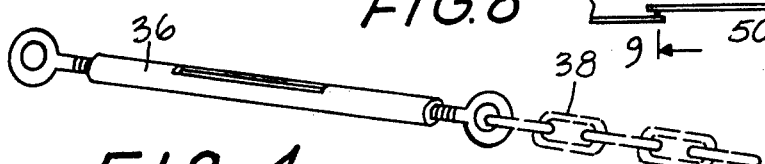
FIG. 5 is a side view of the structure shown in FIG. 3 with locking means removed.
Figure 5:
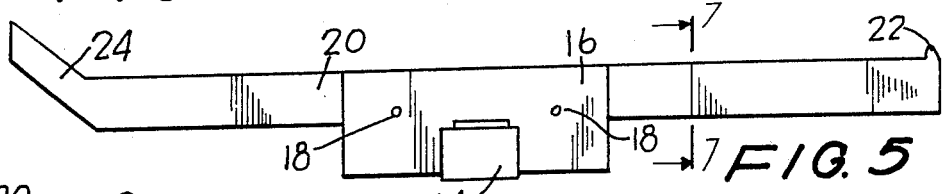
Figure 6:
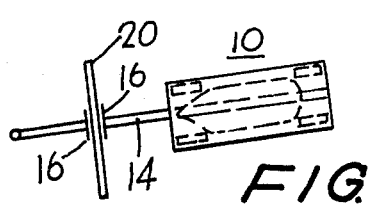
FIG. 6 is a perspective view of the invention.
Figure 7:
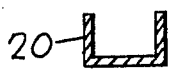
FIG. 7 is a cross section of the member of FIG. 5.

Referring now to FIGS. 1–7, a wheeled trailer 10 supports a demountable boat 12 and is provided with a longitudinally extending horizontally elongated rigid metal bar 14 of rectangular cross section which extends in front of the boat. Suitable means (not shown) at the free end of the bar enables same to be detachably coupled to suitable mating means on the vehicle which is to pull the trailer.

First and second like parallel vertical metal plates 16 are welded to the bar in spaced position and extend upward therefrom as well as outward from opposite sides of the bar at right angles thereto. Each plate has two horizontally spaced holes 18, each hole in one plate being aligned with the corresponding hole in the other plate to form a hole set.

A horizontally elongated metal member 20 has one end with a transversely disposed horizontal lip 22 extending upward from the top. The opposite end 24 extends inclinedly outward and upward. Member 20 has a bottom disposed transversely extending horizontal groove 26 and is disposed between plates 16 with groove 26 resting on the bar. The groove extends sufficiently past each side of the bar to enable the member to be pivotable about the bar. The member in cross section has the shape of a U.

The member extends past both plates at right angles to the bar. The member has two horizontally separated parallel transversely extending horizontal bores 28. Each bore can be disposed between the holes of a corresponding hole set.

Elongated bolts 30 having nuts 32 removably and threadedly engaged thereto can be removably disposed through each hole set and the aligned bore to lock the member in horizontal position or to unlock the member and allow it to pivot.

The invention can then be used as described. Once the motorcycle has been disposed on the member and the member locked horizontally in place hooks 34 secured to the motorcycle can be each secured by a turnbuckle 36 and chain 38 to a corresponding hook 40 welded to the bar to hold the motorcycle firmly in position on the trailer.

As shown in FIGS. 8 and 9, member 20 can have the lip removed. An extension 50 can be detachably secured at one end to the lip free end of member 20 by detachably engagable snap means 52. The extension can touch the ground to facilitate movement of a motorcycle thereon.

The extension when not in use can be carried on the trailer and secured thereto with wing nuts.

While the invention has been described with detailed reference to the drawings, the protection sought is to be limited only by the terms of the claims which follow.

What is claimed is:
1. A trailer for supporting a boat and at least one motorcycle which comprises:
   a horizontally elongated longitudinally disposed bar having boat carrying means supported thereon;
   first and second like parallel vertical plates secured to said bar in spaced positions, said plates extending upward from the bar and outward from opposite sides of the bar at right angles thereto, each plate having two horizontally spaced holes therein, each hole in one plate being aligned with the corresponding hole in the other plate to form a hole set;
   a horizontally elongated member being adapted to support the front and rear wheels of a motorcycle or the like extending at right angles to the bar, said member being disposed between said plates and extending outward past the plates on both sides of the plates, said member having two horizontally spaced transversely disposed horizontal bore, each bore being aligned with and disposed between the holes in the corresponding hole set, the top of one end of the member having a raised lip, the other end of the member being upwardly inclined, said member pivotally engaging said bar; and
   first and second like elongated manually operable locking means, each means extending removably through a corresponding hole set and corresponding aligned bore.
2. The trailer of claim 1 wherein said member has a centrally disposed transversely extending bottom disposed horizontal groove through which said bar extends.
3. The trailer of claim 2 wherein said groove is sufficiently larger in cross-sectional area than the cross-sectional area of the bar to permit said member to pivot easily when both means are removed.
4. The trailer of claim 3 wherein said member in cross section has a U shape.

* * * * *